Figure 1:
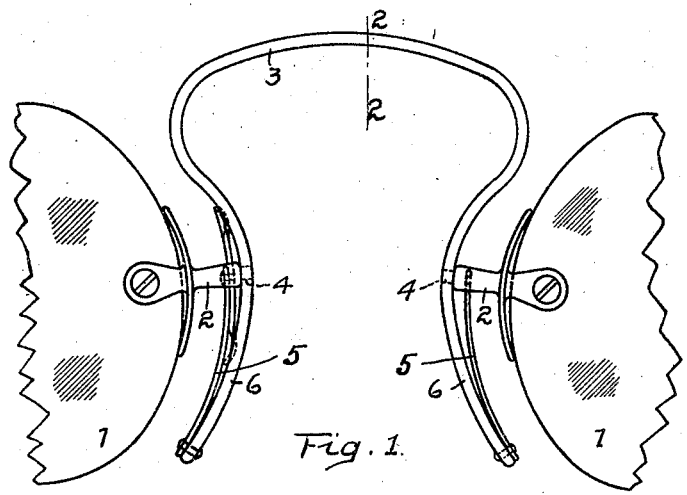

Nov. 9, 1926.

E. E. DEHLER 1,606,062

GUARD FOR EYEGLASSES AND THE LIKE

Filed Jan. 8, 1923

INVENTOR
Evan E. Dehler
BY
*Elwin M. Hulse*
ATTORNEY

Patented Nov. 9, 1926.

1,606,062

UNITED STATES PATENT OFFICE.

EVAN E. DEHLER, OF FORT WAYNE, INDIANA.

GUARD FOR EYEGLASSES AND THE LIKE.

Application filed January 8, 1923. Serial No. 611,228.

The invention relates to guards for eyeglasses, spectacles and the like, and its object is to provide a practical and efficient guard for the mountings of such articles that will resiliently and firmly hold the article on the nose.

The invention consists in the novel construction and arrangement of parts hereinafter referred to and illustrated in the drawings, in which—

Figure 2:
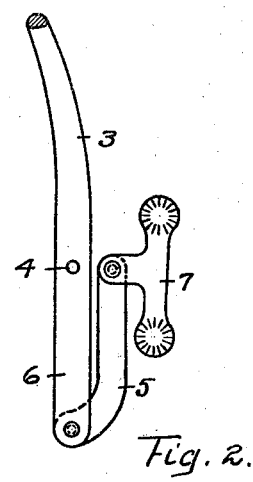
Figure 4:
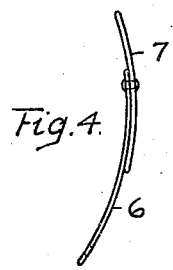
Figure 3:
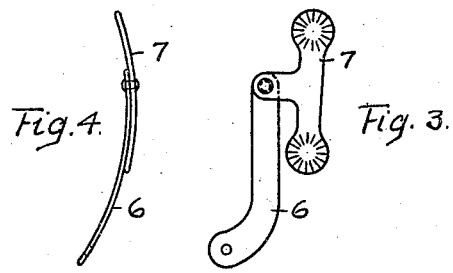
Figure 5:
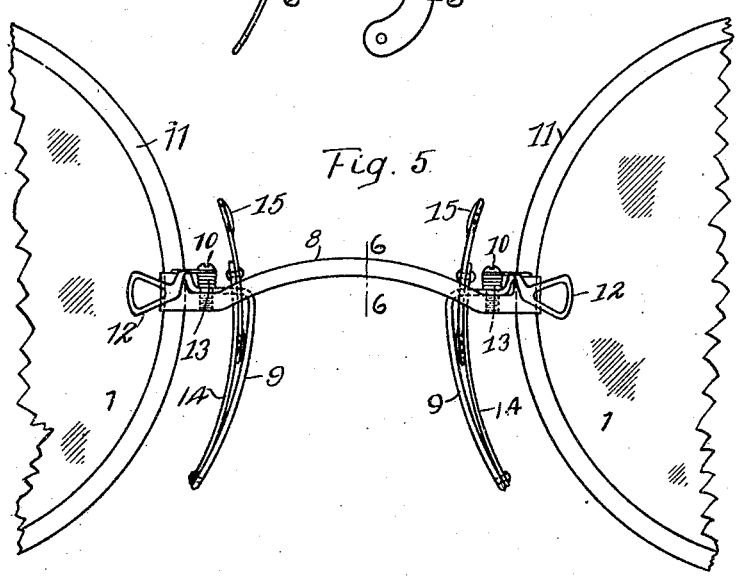
Figure 6:
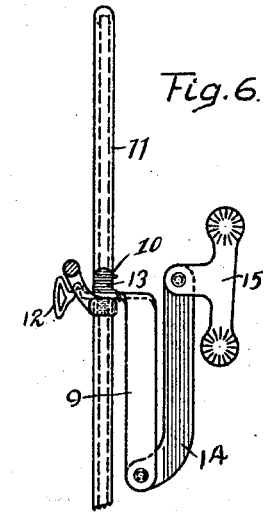

Figure 1 is a front elevational view of a mounting employing the invention; Fig. 2 a cross-sectional view of the same on line 2—2 of Fig. 1; Fig. 3 an elevational view of the guard; Fig. 4 an edge view of the guard; Fig. 5 a front elevational view of a modified form of mounting employing the invention; Fig. 6 a cross-sectional view of the same on line 6—6 of Fig. 5.

Referring to the embodiment of the invention illustrated in the drawings, 1 represents the usual lenses and 2 the usual lens supports or straps of the mounting. The bridge 3 is connected at 4 to each support or strap 2 and is extended downwardly and outwardly in a selected curve. A flat spring 5 is secured at its lower end to the outer side of the lower end of the extension 6 of the bridge, the spring being extended upwardly and having secured to its upper end a nose gripping member 7 of suitable form, the member 7 illustrated being well adapted for my purpose.

The flat spring 5 is disposed rearwardly of the extension 6 and slightly at one side of the extension hence it cooperates with the said extension to form a suction on the skin, while the member 7 is caused by the spring to firmly grip the nose, thus affording a large bearing surface on the guard and its supporting spring.

In Figs. 5 and 6 I have illustrated the application of the invention to the so-called finger-piece mounting in which the bridge 8 is secured at its opposite ends in suitable manner to the lenses 1 or to the lens frames 11. The member 9, that corresponds to the extension 6 in Fig. 1, is bent laterally and forwardly at its upper end and pivoted at 10 to the bridge or other member fixed to the lens or to the frame 11, the forward end of the member 9 having a finger grip 12 thereon. A spring 13 opposes the pivotal motion of the member 9 in the usual manner.

The spring 14, corresponding to the spring 5 in Fig. 1, is secured, at its lower end, to the lower end of the member 9, and the nose grip 15 is secured to the upper end of the spring 14 as before described. The flat spring 14 is disposed with reference to the member 9 exactly as the spring 5 is disposed with reference to the extension 6. The guard illustrated in this application of the invention functions in the same manner as the guard illustrated in Figs. 1-4 previously described.

In both applications of the invention above described the guard positively grips the nose and rigidly supports the lenses in proper position without inconvenience to the wearer. The spring portion of the guard not only cooperates with the rigid extension 6 or the member 9 to produce a suction on the skin but it also provides an automatic adjustment of the entire guard to the nose thus accomplishing its positive gripping action on the nose.

What I claim is:

1. The combination with a lens mounting of a rigid member depending from the mounting, an upstanding flat spring secured at its lower end to the lower end of said member and a nose gripping member secured to the upper end of the spring, the spring being disposed at one side of and rearwardly of the rigid member and adapted to automatically adjust the gripping member on the nose and to cooperate with the rigid member to form a suction upon the skin whereby the lens mounting is firmly held upon the nose.

2. The combination with a lens mounting of a rigid member depending from the mounting, an upstanding flat spring having a lateral extension at its lower end secured to the lower end of the rigid member, and a nose gripping member at the upper end of the spring, the said extension on the spring being such that the spring is disposed in a plane rearwardly of the rigid member and is laterally spaced from said rigid member whereby the spring is caused to move rearwardly from the rigid member when the mounting is applied to the nose and form a suction on the skin thereon.

In witness whereof I have hereunto subscribed my name this 30th day of December, 1922.

EVAN E. DEHLER.